3,706,835
CRASSIN ACETATE USED AS AN ANALGESIC
Donald Bruce Borders, Suffern, and Arnold Curtis Osterberg, Pearl River, N.Y., and Kenneth George Wallo, Wayne, N.J., assignors to American Cyanamid Company, Stamford, Conn.
No Drawing. Filed June 24, 1971, Ser. No. 156,475
Int. Cl. A61k 27/00
U.S. Cl. 424—279         4 Claims

ABSTRACT OF THE DISCLOSURE

New compositions of matter and method of administration are described. The compositions contain as the active component crassin acetate. The compositions are useful for their analgesic activity in warm-blooded animals.

DESCRIPTION OF THE PRIOR ART

Crassin acetate, a cembranolide isolated from a gorgonian, *Pseudoplexaura porosa*, has been described in the literature by Ciereszko, L. S., Sifford, D. H. and Weinheimer, A. J., Annals of the New York Academy of Science, 90, 917 (1960). The chemical analysis of this compound has been established by Weinheimer, A. J., Karns, T. K. B., Sifford, D. H. and Ciereszko, L. S., American Chemical Society Abstracts, P171 (1968) and by Weinheimer, A. J., Schmitz, F. J. and Ciereszko, L. S., in H. D. Freudenthal's "Drugs from the Sea," Marine Technology Society, Washington, D.C., pp. 135–140 (1968). The X-ray crystallographic analysis of crassin as the iodobenzoate derivative has been established by Hossain, M. B. and Van Der Helm, D., Recueil Des Travaux Chimiques Pays-Bas 88, 1413 (1969).

DESCRIPTION OF THE INVENTION

This invention relates to new compositions of matter and methods of administration to warm-blooded animals. More specifically, the invention relates to new compositions useful as analgesics containing as the active ingredient a compound of the formula:

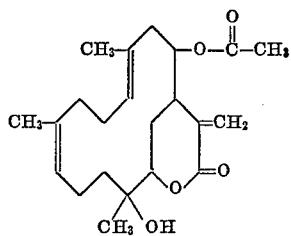

The above compound is described chemically as 2,12,13-trihydroxy-4,8,12-trimethyl-α-methylene-4,8-cyclotetradecadiene-1-acetic acid, δ-lactone, 2-acetate.

The above compound is commonly referred to as crassin acetate. It is colorless crystalline solid, soluble in ethyl acetate, chloroform, ethanol or benzene. It is a cembranolide isolated from a type of coral as described hereinafter.

This crassin acetate is combined with a pharmaceutically acceptable carrier and used as an analgesic agent in warm-blooded animals. It is useful in doses which range from 50 to 250 mg. per kilogram of warm-blooded animal per day.

The active component of this invention can be used in compositions such as tablets; the principal active ingredient is mixed with conventional tableting ingredients such as corn starch, lactose, sucrose, sorbitol, talc, stearic acid, magnesium stearate, dicalcium phosphate, gums, and fractionally similar materials as pharmaceutical diluents or carriers. The tablets or pills of the novel compositions can be laminated or otherwise compounded to provide a dosage form affording the advantage of prolonged or delayed action or predetermined successive action of the enclosed medication. For example, the tablet or pill can comprise an inner dosage and an outer dosage component, the latter being in the form of an envelope over the former. The two components can be separated by an enteric layer which serves to resist distintegration in the stomach and permits the inner component to pass intact into the duodenum or to be delayed in release. A variety of materials can be used for such enteric layers or coatings, such materials including a number of polymeric acids or mixtures of polymeric acids with such materials as shellac, shellac and cetyl alcohol, cellulose acetate and the like. A particularly advantageous enteric coating comprises a styrene maleic acid copolymer together with known materials contributing to the enteric properties of the coating.

The liquid forms in which the novel compoistions of the present invention may be incorporated for administration include suitably flavored emulsions with edible oils, such as, cottonseed oil, sesame oil, coconut oil, peanut oil, and the like, as well as elixirs and similar pharmaceutical vehicles. Sterile suspensions or solutions are required for parenteral use. Isotonic preparations containing suitable preservatives are also highly desirable for injection use.

The term dosage form as described herein refers to physically discrete units suitable as unitary dosage for warm-blooded animal subjects, each unit containing a predetermined quantity of active component calculated to produce the desired therapeutic effect in association with the required pharmaceutical diluent, carrier or vehicle. The specification for the novel dosage forms of this invention are indicated by the unique characteristics of the active component, the particular therapeutic effect to be achieved and the limitations inherent in the art of compounding such an active component for therapeutic use in warm-blooded animals as disclosed in this specification, these being features of the present invention. Examples of suitable oral dosage forms in accord with this invention are tablets, capsules, pills, powders, granules, wafers, cachets, teaspoonfuls, dropperfuls, ampules, vials, segregated multiples of any of the foregoing and other forms as herein described. Such compositions and preparations should contain at least 0.1% of crassin acetate. The percentages in the compositions may vary between about 2% and 60% or more of the weight of the unit. Preferred compositions or preparations, according to the present invention, are prepared so that a dosage unit form contains between about 25 mg. and 500 mg. of crassin acetate. The daily requirements are fulfilled by the use of 2 or more dosage units, depending upon the amount of drug per unit.

The use of crassin acetate as an analgesic is shown in the following tests.

Method A

Measurement was made by the writhing syndrome test for analgesic activity as described by Hendershot and Forsaith, J. Pharmacology Exptl., volume 125, pp. 237–240 (1958), with modifications. This method is based upon the reduction of the number of writhes following the interaperitoneal injection of one mg./kg. of body weight of a phenyl-p-quinone in male Swiss albino mice weighing 15–25 grams per mouse. The syndrome is characterized by intermittent contractions of the abdomen, twisting and turning of the trunk, and extension of the hind legs beginning 3 to 5 minutes after injection of the phenyl-p-quinone. The test compound is administered orally to groups of two mice each, 30 minutes before injection of the phenyl-p-quinone. The total number of writhes exhibited by each group of mice is recorded for a 3-minute period commencing 15 minutes after injection of the phenyl-p-quinone. A compound is considered active if it reduces the total number of writhes in 2 test mice from a control value of approximately 30 per pair to a value of 18 or less. The results of this test are shown in Table I as follows:

TABLE I

| Compound | Oral dose, mg./kg. | Average number of writhes per 3-minute period |
| --- | --- | --- |
| Crassin acetate | 100 | 6 |
| Control | | 30 |

Method B

Measurement was made by a modification of the method of Randall and Selitto, Archives Internationale de Pharmacodynamic et de Therapie, volume 111, p. 409 (1957). This method is used to measure the pain threshold of rats whose paws are made sensitive to pressure of injection of a 20% aqueous suspension (0.1 ml.) of brewer's yeast into the plantar surface of the left hind paw. When sufficient pressure is applied to the inflamed paw, a sudden struggle or vocalization is elicited and the pressure is recorded. A maximum (cut-off) pressure of 250 grams is employed. Control rats respond at a pressure of about 25 grams. The test compound was administered intraperioneally in a starch vehicle. Test recordings were made 1 hour after administration. A post/pre treatment ratio of greater than 1.36 indicates analgesic activity. The results appear in Table II as follows:

TABLE II

| Compound | Dose, mg./kg. | Post/pre-treatment ratio |
| --- | --- | --- |
| Crassin acetate | 100 | 1.7 |
|  | 50 | 1.8 |
| Control | | 1.0 |

The above experiments show the analgesic activity of crassin acetate in mice and rats. It is contemplated that crassin acetate will show similar activity in other warm-blooded animals.

SPECIFIC DESCRIPTION

The following examples describe in detail the isolation of crassin acetate and its formulation into various types of pharmaceutical preparations.

EXAMPLE 1

Isolation of crassin acetate

The gorgonid is preserved in ethanol and a 1 liter portion of the ethanol extract is decanted from the soft coral, filtered and evaporated under reduced pressure to 150 ml. of an oily residue which is partitioned between 500 ml. of water and 500 ml. of ethyl acetate. The aqueous phase is extracted twice more with 300 ml. portions of ethyl acetate and the extracts are combined. The combined extracts are washed with 300 ml. of water and evaporated under reduced pressure to give 7.25 gm. of an oily residue which is dissolved in 25 ml. of chloroform and charged onto a column. The 3 x 40 cm. column is packed with silicic acid (100 mesh) in chloroform. After introduction of the charge, the column i sdeveloped with 2300 ml. of 1% methanol in chloroform. Crassin acetate is detected at 180–630 ml. of column effluent. The fractions corresponding to the peak are pooled and evaporated under reduced pressure to yield 3.78 g. of crystalline material. The product is recrystallized from benzene-hexane as colorless crystals, melting point 144–146° C., with the following properties:

$[\alpha]_D^{25} + 98.5$ (C. 0.558, $CDCl_3$); $[\alpha]_D^{25} + 70.7$ (C. 1.945, $CH_3OH$); m/e 376.2244 (calc. for $C_{22}H_{32}O_5$: 376.2250).

Analysis.—Calculated for $C_{22}H_{32}O_5$ (percent): C, 70.17; H, 8.57. Found (percent): C, 70.81; H, 8.59.

UV spectrum had $$\lambda_{max.}^{CH_3OH} \ 204 \text{ nm.} \ (\epsilon, 16{,}000)$$

EXAMPLE 2

Preparation of 50 mg. tablets

| Material | Per tablet, gm. | Per 10,000 tablets, gm. |
| --- | --- | --- |
| Crassin acetate | 0.050 | 500 |
| Lactose | 0.080 | 800 |
| Corn starch (for mix) | 0.010 | 100 |
| Corn starch (for paste) | 0.008 | 80 |
| Total | 0.148 | 1,480 |
| Magnesium stearate (1%) | 0.002 | 20 |
| Total | 0.150 | 1,500 |

Crassin acetate, lactose and corn starch (for mix) are blended together. The corn starch (for paste) is suspended in 600 ml. of water and heated with stirring to form a paste. This paste is then used to granulate the mixed powders. Additional water is used if necessary. The wet granules are passed through a number 8 hand screen and dried at 120° F. The dry granules are then passed through a number 16 screen. The mixture is lubricated with 1% magnesium stearate and compressed into tablets.

EXAMPLE 3

Preparation of oral syrup

Ingredient:
- Crassin acetate _____ mg __ 500
- Sorbitol solution (70% N.F.) _____ ml __ 40
- Sodium benzoate _____ mg __ 150
- Saccharin _____ mg __ 10
- Red Dye (F. D. & C. No. 2) _____ mg __ 10
- Cherry flavor _____ mg __ 50
- Distilled water qs. ad 100 ml.

The sorbitol solution is added to 40 ml. of distilled water and the crassin acetate is suspended therein. The saccharin, sodium benzoate, flavor and dye are added and dissolved in the above solution. The volume is adjusted to 100 ml. with distilled water. Each ml. of syrup contains 5 mg. of crassin acetate.

Other ingredients may replace those listed in the above formulation. For example, suspending agent such as bentonite magma, tragacanth, carboxymethylcellulose or methylcellulose may be used. Phosphates, citrates or tartrates may be added as buffers. Preservatives may include the parabens, sorbic acid and the like and other flavors and dyes may be used in place of those listed above.

EXAMPLE 4

Preparation of parenteral solution

In a solution of 700 ml. of propylene glycol and 200 ml. of water for injection is dissolved 10.0 gm. of crassin acetate with stirring, and the volume is made up to 1000 ml. with distilled water. The formulation is filtered through a 0.22 micron sterilizing filter, filled into ampules, each containing 5 ml. (representing 50 mg. of drug) and sealed under nitrogen.

We claim:

1. A method of meliorating pain in warm-blooded animals which comprises internally administering to said animals an analgesically effective amount of crassin acetate in association with a pharmaceutically acceptable carrier.

2. The method of claim 1, wherein the crassin acetate is present in from about 50 to about 250 milligrams per kilogram of body weight of the warm-blooded animal.

3. A solid therapeutic composition having analgesic activity in warm-blooded animals which comprises a solid pharmaceutically acceptable carrier and from 25 mg. to 500 mg. of crassin acetate.

4. The composition of claim 3, in the form of a tablet.

References Cited

Chemical Abstracts 55: 14733g (1961).
Chemical Abstracts 57: 17048b (1962).

STANLEY J. FRIEDMAN, Primary Examiner

L. SCHENKMAN, Assistant Examiner